United States Patent
Jacobson et al.

(10) Patent No.: US 11,119,872 B1
(45) Date of Patent: Sep. 14, 2021

(54) LOG MANAGEMENT FOR A MULTI-NODE DATA PROCESSING SYSTEM

(71) Applicant: HEWLETT PACKARD ENTERPRISE DEVELOPMENT LP, Houston, TX (US)

(72) Inventors: Erik Daniel Jacobson, Eagon, MN (US); Corneliu Mihai Boac, Eagon, MN (US); Pradeep Kumar Armugam, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/889,898

(22) Filed: Jun. 2, 2020

(51) Int. Cl.
*G06F 11/00* (2006.01)
*G06F 11/20* (2006.01)

(52) U.S. Cl.
CPC ........ *G06F 11/2023* (2013.01); *G06F 11/202* (2013.01); *G06F 11/2043* (2013.01); *G06F 2201/805* (2013.01)

(58) Field of Classification Search
CPC ..... G06F 11/0709; G06F 11/0766–079; G06F 11/20; G06F 11/202; G06F 11/2023; G06F 11/2025; G06F 11/2043; G06F 11/2046
See application file for complete search history.

(56) References Cited

U.S. PATENT DOCUMENTS

| | | | |
|---|---|---|---|
| 7,721,152 B1* | 5/2010 | Joshi | H04L 41/0893 714/25 |
| 7,890,626 B1 | 2/2011 | Gadir | |
| 9,288,178 B2 | 3/2016 | Jeyapaul et al. | |
| 2004/0153558 A1* | 8/2004 | Gunduc | G06F 9/5055 709/229 |
| 2014/0108087 A1 | 4/2014 | Fukui et al. | |
| 2016/0034361 A1* | 2/2016 | Block | H04L 63/1416 714/4.12 |
| 2017/0220431 A1* | 8/2017 | Joshi | G06F 11/2028 |

OTHER PUBLICATIONS

Conserver, "What is conserver?"; https://www.conserver.com/; Apr. 7, 2020, 2 pages.
CTDB, "Welcome to the CTDB web pages"; https://ctdb.samba.org/; Apr. 24, 2020, 3 pages.
(Continued)

*Primary Examiner* — Michael Maskulinski
(74) *Attorney, Agent, or Firm* — Trop, Pruner & Hu, P.C.

(57) ABSTRACT

A computer-readable medium comprises instructions which, upon execution by a node in a multi-node data processing system, enable the node to serve as a first leader node by receiving system log data from multiple compute nodes in a first cluster of the multi-node data processing system, and by saving the system log data in shared storage that is also used by second and third leader nodes to save system log data for compute nodes in second and third clusters of the multi-node data processing system. The instructions further enable the node to respond to failure of either of the second and third leader nodes by automatically assuming system logging duties for the compute nodes in the cluster that was associated with the failed leader node. The instructions may also enable the node to serve as a console bridge and to save console log data in the shared storage.

20 Claims, 7 Drawing Sheets

(56) References Cited

OTHER PUBLICATIONS

Dino Quintero et al., "Simplify Management of Security and Compliance with IBM PowerSC in Cloud and Virtualized Environments," Sep. 17, 2019, pp. 1-342, Second Edition, IBM.
Hewlett Packard Enterprise "QuickSpecs, HPE Performance Cluster Manager"; Dec. 9, 2019, 12 pages.
Hewlett Packard Enterprise Support Center, "HPE Performance Cluster Manager," Search Results, Apr. 9, 2020, 10 pages.
Hewlett Packard Enterprise, "HPE Performance Cluster Manager, Administration Guide"; Part No. 007-6499-005; Apr. 2019, 329 pages.
Hewlett Packard Enterprise, "HPE Performance Cluster Manager, Installation Guide"; Part No. 007-6501-005; Apr. 2019, 230 pages.
Ryslog, "rsyslog"; https://www.rsyslog.com/; Apr. 25, 2020, 3 pages.
Sanjay Sabnis et al., "Centralized and Externalized Logging Architecture for Modern Applications Using Rack Scale Flash Storage," Jul. 4, 2018, pp. 1-6, Database Zone.
Wiki, "Pacemaker—ClusterLabs"; https://wiki.clusterlabs.org/wiki/Pacemaker; Apr. 24, 2020, 4 pages.
Wiki, GitHub, dun/conman; https://github.com/dun/conman/wiki; May 4, 2020, 1 page.

* cited by examiner

Computer-Readable Medium 510

Instructions 520

Upon execution, the instructions cause a node to serve as a first leader node by:

o  receiving system log data from multiple compute nodes in a first cluster of the multi-node data processing system;
o  saving the system log data in shared storage that is also used by a second leader node to save system log data for compute nodes in a second cluster of the multi-node data processing system and by a third leader node to save system log data for compute nodes in a third cluster of the multi-node data processing system; and
o  in response to failure of either of the second and third leader nodes, automatically assuming system logging duties for the compute nodes in the cluster that was associated with the failed leader node.

FIG. 5

LOG MANAGEMENT FOR A MULTI-NODE DATA PROCESSING SYSTEM

BACKGROUND

A multi-node data processing system with traditional hierarchical management may include thousands of compute nodes, along with multiple leader nodes and a head node. The compute nodes may be organized into clusters at the lowest level. The intermediate level may include the leader nodes, with each leader node managing a cluster. The head node may operate at the highest level.

BRIEF DESCRIPTION OF THE DRAWINGS

FIG. 5 is a block diagram of a computer-readable medium comprising instructions which, upon execution by a node in a multi-node data processing system, enable the node to serve as a leader node.

DETAILED DESCRIPTION

Figure 1:
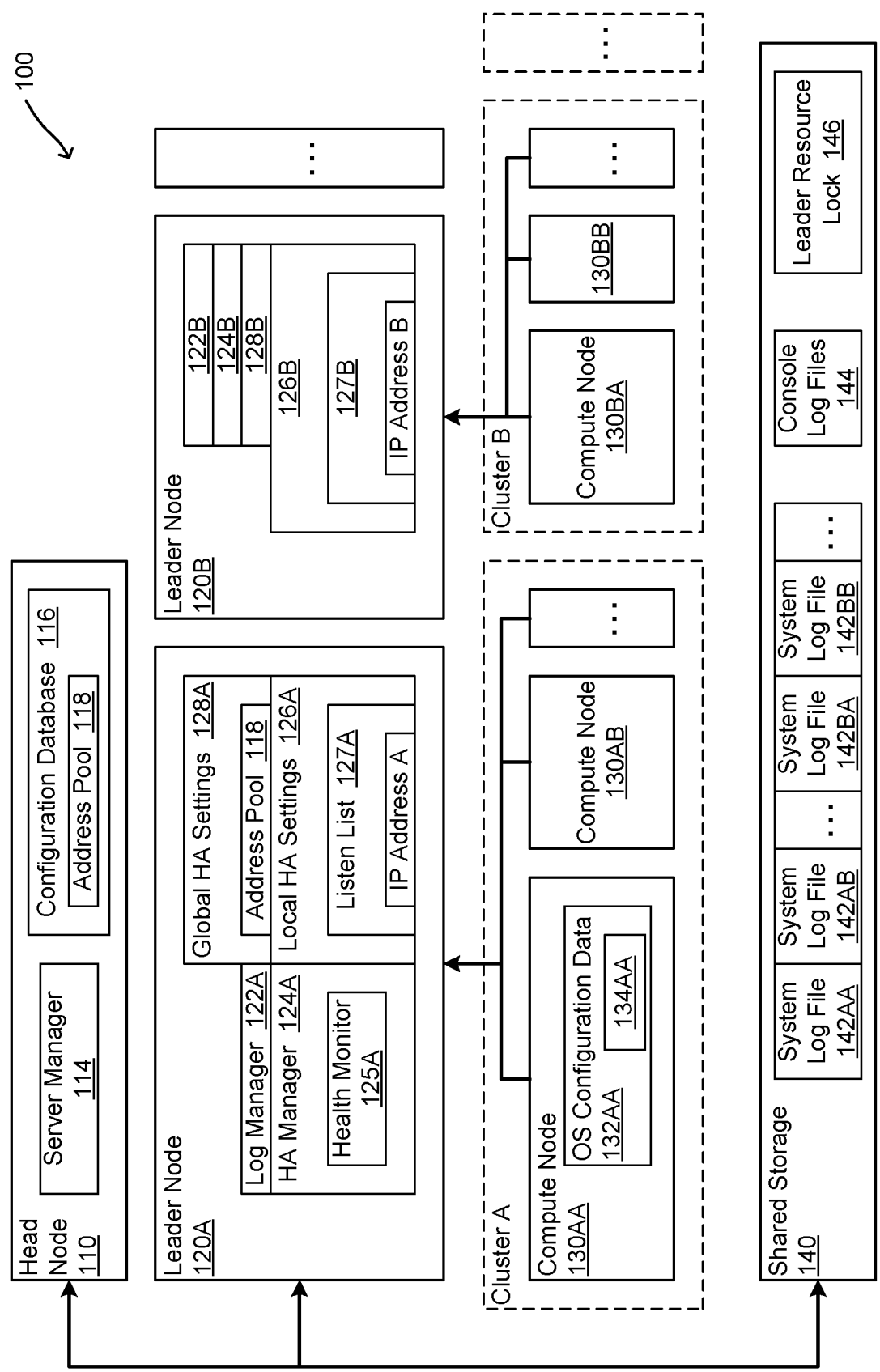
FIG. 1 is a block diagram of a multi-node data processing system with technology for resilient logging of system log data according to an example implementation.

This disclosure describes an efficient method to provide for failover for leader nodes within a multi-node data processing system. For purposes of this disclosure, a multi-node data processing system may be referred to as a "multi-node system."

The management operations performed by a leader node may include handling the load of saving system logs and console logs for each of the compute nodes under that leader node. In the traditional approach, each leader is directly associated with a set of nodes and handles those console logs and system logs directly. A system administrator may then log in to a leader node to access the console logs and the system logs that were saved by that leader node.

The management operations performed by a leader node may also include console connection forwarding. A leader node performs console connection forwarding by serving as an intermediary to enable the head node to access the system console of a compute node via the leader node. In particular, the head node may connect to the leader node, and the leader node may forward that connection to the system console of a compute node. A leader node may provide for console connection forwarding by instructing the head node to connect to the leader node as an intermediary instead of connecting directly to the compute node.

One of the challenges that hierarchical multi-node data processing systems face is the risk that a leader node may fail. Failover for logging and for console connection forwarding may not be implemented, or if it is implemented, it may be based on a system of having two leader nodes for each cluster, which is expensive and restrictive. For instance, to provide for high availability of computing resources, each cluster may have a primary leader node which usually handles logging and console connection forwarding for a cluster, as well as a backup leader node which only performs logging and console connection forwarding duties after the primary leader node has failed. Such a backup leader node may be referred to as a "redundant leader node." However, it may be costly to equip a multi-node data processing system with redundant leader nodes. For instance, if a system with ten clusters and ten primary leader nodes uses redundant leader nodes, that system may require ten backup leader nodes.

According to one example, a multi-node system is organized within a network in a hierarchical manner, with a head node at the top, a set of leader nodes in the middle, and many compute nodes at the bottom. The head node configures the leader nodes to provide console management and logging functions for the compute nodes. The compute nodes, which run the user-facing jobs, are organized into clusters. The head node assigns a logging address to each compute node, to specify the destination for logging data that that compute node will send over the network. A logging address may be an internet protocol (IP) address or a host name, for instance. Also, each compute node runs an operating system (OS) that pushes operating system log data to a leader node via that logging address. The operating system log data may be referred to as "system log data" or "syslog data." The leader nodes save that system log data to shared storage that is accessible to the leader nodes and to the head node.

For purposes of this disclosure, the term "system log data" refers to the data that is produced by a logging service of the OS of a node, to document events that have occurred during operation of that node. Different OSs may use different names for the logging service. For instance, a Unix OS may use a daemon named "syslog." A Unix-like OS such as Linux may also use a daemon named "syslog," or similar daemons such as a daemon named "syslogd" or a daemon named "syslogr." In addition or alternatively, a Unix-like OS may use a logging function within another daemon named "systemd." However, other types of OSs may use logging services with other names. Also, the data that is logged (i.e., the data that is produced by the logging service of the OS) may originate from the OS, or it may originate from another component, which then sends the data to the OS for logging. For instance, the OS may generate log data during the boot process to document boot events (e.g., to document that various services have been started, or have failed to start). The OS may also generate log data during post-boot operations to document events detected by the OS. Those events may include detected hardware conditions or errors, authentication events, etc. The detected hardware conditions may include memory faults, disk failures, overheating, etc. The log data for authentication events may document each attempt to log in with information such as the user identifier (ID) involved, the time, and whether the attempt succeeded or failed. The log data generated by the OS during post-boot operations may also include log data from OS services. For instance, a Dynamic Host Configuration Protocol (DHCP) server in the OS may receive requests for Internet Protocol (IP) addresses from hardware components in the node, and the DHCP server may generate log data to document each such request and how it was handled. For example, in connection with successfully processing a request for an IP address, a DHCP server may generate syslog data such as the following:

May 22 15:23:50 indeed dhcpd[8756]: DHCPACK on 172.24.0.9 to 52:54:00:62:cd:f5 via bond0

And in connection with rejecting a request for an IP address, the DHCP server may generate syslog data such as the following:

dhcpd-20191219:Dec 18 18:31:54 indeed dhcpd[16611]: DHCPDISCOVER from 52:54:00:62:cd:f5 via bond0: network cluster-networks: no free leases As indicated above, the data that is logged may also originate outside of the OS. For instance, an application may send data to the OS to be included in the system log data. Similarly, a user may utilize a command line interface (CLI) of the OS to send data to the system log. Thus, as problems happen (including environmental problems, hardware problems, system service problems, and software problems), the OS produces system log data to describe those problems. The system log data may then be used to debug problems and recover from problems, to perform security audits, etc.

In one example, the OS in a compute node is configured to send the log data that is produced by that compute node to a particular destination. For instance, in one example, the compute node is configured to send its log data to a particular network address, as indicated above. Also, a corresponding leader node is configured to listen to that address, and to save the log data that is received via that address to shared storage. For instance, as described in greater detail below, leader nodes may save the system log data for each compute node in a separate file.

Each node features a system console. The system console (or "console" for short) is an interface that can be used by a system administrator to interact with the node's basic input/output system (BIOS) and to interact at a basic level with the node's OS. For instance, the console may provide a command line interface (CLI) that accepts commands and displays results. In one embodiment or scenario, the console provides a means to access BIOS settings prior to operating system startup, and the console will display all messages from the OS boot process. Once the system is booted, the console provides a means to access and log into the node at a low level. Also, if other methods to access the system become inaccessible (e.g., due to network or software problems), the console may be used to debug the problem. The system log data may also include system console input and output. However, debugging and error messages may appear on the console even if they do not make it into the system log due to network problems or hardware problems such as disk failure.

In one example, a system administrator may use (I/O) devices connected to a node to interact with that node's console. In another example, a system administrator uses one node to interact with the console of another node. For instance, a system administrator may use a head node to interact with the console of a compute node. When a first node is used to interact with the console of a second node, the first node may be referred to as a "console server," and the second node may be referred to as the "managed node." To establish a console connection, the console server may connect to a management processor of the managed node.

In another example, a client node uses an intermediate node to interact with the console of a managed node. In particular, a head node may be a client, and it may use a leader node to interact with the console of a compute node. In such an example, the head node and the leader node are both console servers, because each is used (directly or indirectly) to interact with the console of the compute node. However, the leader node may also be referred to more specifically as a "console bridge," because the leader node serves as an intermediary to enable the head node to interact with the console of the compute node. In other words, a "console bridge" is a leader node that has been configured to accept, from the head node, a request for a console connection to a compute node, and to respond to such a request by establishing a connection to that compute node, to enable the head node to interact with the console of the compute node via the leader node. For instance, once the bridge node has connected to the console of the compute node, the head node may use the bridge node to interact with a CLI of an OS on the compute node. Thus, for the head node to interact with the console of a compute node, the head node actually connects to a console bridge, and the console bridge than forwards that connection to the compute node. As described in greater detail below, the head node and/or the console bridge are configured with configuration data to associate a console bridge with particular compute nodes, and to enable the head node to connect to the appropriate console bridge for a desired compute node.

The console management functions to be performed by the leader nodes may include console connection forwarding and console logging. For purposes of this disclosure, "console connection forwarding" denotes a service that is provided by a leader node which enables a head node to interact with the console of a compute node via that leader node. Thus, console bridges are nodes that provide console connection forwarding.

In one example, when a leader node provides console connection forwarding, a system administrator may use a single command on the head node to connect to the console on any compute node, no matter which leader node is currently managing that console. The leader nodes may provision the head node with configuration data that enables the head node to make such connections. In other words, the leader nodes configure the head node with configuration data to enable connection forwarding. That configuration data may be referred to as "console connection forwarding configuration data" (CCFCD). Leader nodes may also pull console log data from the compute nodes and save that log data to the shared storage, as well. For instance, when the leader nodes provide console connection forwarding, the leader nodes may also save the corresponding console log data to the shared storage. The head node may also participate in the shared storage, so that the console logs and system logs are all locally available for the system administrator via the head node.

Each leader node typically manages a cluster of compute nodes. However, any leader node can also take over management duties such as logging and console management from any failed leader node. In other words, any leader node can serve as a failover node. Also, once a failed node has been restored to operation, the restored node may take back its original duties from the failover node. Conditions of a node which may be considered failure include the node freezing or shutting down, storage in the node malfunctioning, services stopping unexpectedly, etc.

In one example, each leader node runs a high-availability (HA) management program or ("HA manager") that can detect when another leader node has failed, and that can respond by taking over management duties from the failed node. In particular, the HA manager enables the leader nodes to decide amongst themselves which leader node will serve as the failover node for a failed leader node. Also, once a failed leader node has been restored to operation, that restored node may take back its original duties from the failover node.

Leader nodes may use lists of logging addresses known as "listen lists" to dynamically shift management duties amongst leader nodes. For purposes of this disclosure, a listen list in a leader node is list of logging addresses that are to be serviced or handled by that node. Accordingly, each leader node may service syslog data based on the listen list in that leader node.

In one example, the head node assigns the same logging address to each compute node in a cluster. In this example, all of the compute nodes in a cluster may send their system logs to the same logging address. The head node may also use a different logging address for each cluster. Consequently, each cluster may send its system logs to a different logging address.

Also, each leader node may normally service the logging address used by one cluster. For example, an initial configuration for a multi-node system may provide for each leader node to have a listen list that contains one logging address. Such a configuration may also be referred to as a "default configuration" or a "normal configuration," such a listen list may be referred to as a "default listen list" or a "normal listen list", and the logging address in a default listen list of a leader node may be referred to as the "primary" logging address for that leader node. For example, a default configuration for a multi-node system may provide for each leader node to have a default listen list that contains one primary logging address.

When a leader node fails, the logging address in that leader node's listen list may be referred to as an "orphan logging address." Similarly, the compute nodes that are using the orphan logging address may be referred to as "orphan nodes" or collectively as an "orphan cluster." Upon failover, a leader node which may be referred to as a "failover leader node" may take over responsibility for handling the system logs for the orphan cluster. The failover node may assume that responsibility be adding the orphan logging address to the listen list of the failover node. The failover leader node may then service a primary logging address used by a first cluster and an orphan logging address used by the orphan cluster.

As indicated above, a logging address may be an IP address, for instance. Also, such an IP address may be referred to as an "IP alias," since that address serves, more or less, as a name for the leader node that is currently responsible for saving the system log data which is sent to that address, and since the responsibility for handling logging addresses may shift among the leader nodes over time.

A multi-node system according to the present disclosure may provide for high availability without requiring a redundant leader node for each primary leader node. Instead, all leader nodes may typically be active, and each leader node may serve as a failover leader node for any other leader node. Therefore, such a system may provide for high availability without requiring as many leader nodes as would be needed to provide each cluster with a primary leader node and a dedicated backup leader node.

FIG. 1 is a block diagram of a multi-node system 100 with technology for resilient logging of system log data according to an example implementation. Multi-node system 100 is organized in a hierarchical manner, with a head node 110 at the top, multiple leader nodes (e.g., leader node 120A, leader node 120B, etc.) in the middle, and multiple clusters (e.g., cluster A, cluster B, etc.) at the bottom. Each cluster includes multiple compute nodes. For instance, cluster A includes compute nodes 130AA, 130AB, etc., and cluster B includes compute nodes 130BA, 130BB, etc.

Multi-node system 100 also includes shared storage 140 that can be accessed by head node 110 and by the leader nodes. In addition, even if any of the leader nodes fails (and even if the head node fails), shared storage 140 remains accessible to the other leader nodes and to head node 110. For instance, shared storage 140 may be implemented using technologies such as the file system generally referred to by the name or trademark of Gluster, the file system generally referred to by the name or trademark of Oracle Cluster File System (OCFS) or OCFS2, etc. However, in other examples, the leader nodes and head node may use shared storage that resides outside of the multi-node system. For instance, the shared storage may be provided by an external storage device that is connected to the multi-node system via a network connection; a fibre channel connection; a connection involving Small Computer System Interface (SCSI) standards, such as a Serial Attached SCSI (SAS) connection; etc.

In one example, head node 110 runs a server management program. The server management program may be also be referred as a "server manager 114." Head node 110 may use server manager 114 to configure multi-node system 100 for HA operation. For instance, server manager 114 may create a list of IP addresses to be used by the compute nodes for system logging. That list of IP addresses may be referred to as an "address pool." For instance, FIG. 1 shows a configuration database 116 in head node 110 that includes such an address pool 118.

Head node 110 may also cause each compute node to send its system log to a particular IP address from address pool 118. In particular, server manager 114 in head node 110 may assign a first IP address from address pool 188 to each of the compute nodes in a first cluster, a second IP address from address pool 118 to each of the compute nodes in a second cluster, etc., with each compute node to use its assigned IP address for system logging.

In one example, server manager 114 assigns a logging address to each compute node by including that logging address in OS configuration data for that compute node. For instance, server manager 114 may create OS configuration data 132AA for compute node 130AA, and OS configuration data 132AA may include the logging address to be used by compute node 130AA for system logging. For instance, server manager 114 may configure a compute node with a logging address by passing that address as an option to the kernel parameter list of that node.

In FIG. 1, the assigned logging address for compute node 130AA is depicted as logging address 134AA. Server manager 114 may also assign that logging address to the other compute nodes in cluster A. And as indicated above, server manager 114 may assign different logging addresses to the compute nodes in the other clusters. For instance, server manager 114 may assign a first logging address (e.g., IP address A) to the compute nodes in cluster A, a second logging address (e.g., IP address B) to the compute nodes in cluster B, etc.

Each compute node boots up into a particular configuration, based on the OS configuration data for that compute node, and the OS configuration data causes that compute node to send its system log data to the assigned logging address. In one example, server manager 114 configures network boot files for the compute nodes in such a way that a logging address is defined for each compute node. In another example, compute nodes may use local boot files, and server manager 114 may configure those local boot files with the logging addresses. The OS in each compute node may include logging software, and server manager 114 may also ensure that that logging software is configured to send all log messages to the assigned logging address.

In other examples, a head node may use other techniques to configure each compute node with an assigned logging address. For example, a head node may configure all compute nodes with the same logging address, and a node which listens to that address may operate as a load balancing node by distributing logging data for different compute nodes to different leader nodes. Such a load balancing node may also dynamically adjust which leader nodes handle which compute nodes.

When server manager 114 assigns a different logging address to each cluster of compute nodes, server manager 114 may use equal or similar cluster sizes, to enable the load of system logging to be distributed in a relatively even manner across the leader nodes. For instance, if there are 10 leader nodes and 10,000 compute nodes in a multi-node system, the head node may define a logging address pool with 10 logging addresses, the head node may group the compute nodes into clusters of size 1,000, and the head node may assign a different logging address to each cluster, with each node within a cluster getting the same logging address. This kind of approach may be referred to as "static balancing." In general, for a multi-node system with X leaders and Y compute nodes, the head node may use approximately X different logging addresses, and the head node may group the compute nodes into clusters with a size of approximately Y/X compute nodes per cluster.

As indicated above, multi-node system 100 includes multiple leader nodes (e.g., leader node 120A, leader node 120B, etc.). As described in greater detail below, leader node 120A includes a log management program (or "log manager") 122A, an HA manager 124A, local HA settings 126A, and global HA settings 128A. HA manager 124A includes programs such as a health monitor 125A. Local HA settings 126A include data to configure leader node 120A in particular, such as a listen list 127A. In other words, the local HA settings in a leader node include the settings that are active on that node. The global HA settings include data that is used by all leader nodes to provide for HA operation, such as a copy of address pool 118. Accordingly the global HA settings may be considered to be a system-wide shared database that is used by the leader nodes to coordinate management of compute nodes.

Each leader node in multi-node system 100 (e.g., leader node 120B, etc) may include the same kinds of features as those depicted in leader node 120A. For instance, leader node 120B may include a log manager 122B, an HA manager 124B with programs such as a health monitor, local HA settings 126B with a listen list 127B, and global HA settings 128B.

Server manager 114 configures each leader node to handle tasks such as receiving system log data from compute nodes and saving that data to shared storage 140. In one example, server manager 114 does that by configuring the OS image for each leader node with the necessary software, such as the log manager, and then saving that OS image on the root disk drive for each leader node. In addition, server manager 114 may subsequently push configuration data for the leader node to that root disk drive. For instance, server manager 114 may use a Secure Shell (SSH) protocol to transfer files to root disk drives for leader nodes.

The configuration data that head node 110 pushes to each leader node may include the global HA settings. As indicated above, the global HA settings may include address pool 118. The global HA settings may also include additional data to enable the leader nodes to cooperatively handle system logging and console management. That additional data may include, for instance, a list to identify all of the leader nodes, and data to identify a file in shared storage 140 to serve as a leader resource lock 146, to be used by the leader nodes to cooperate. For instance, the leader nodes may use leader resource lock 146 to ensure atomic operations and to ensure that all active leader nodes agree on any configuration changes.

Thus, head node 110 may configure all leader nodes to be system log (or "syslog") listeners for any possible compute node, and to write any received syslog data to shared storage 140. As described in greater detail below, the leader nodes may then cooperate to assign a different one of the logging addresses to the listen list in each leader node. However, in other examples, a head node may use other techniques to configure each leader node. For instance, each leader node may include a server management daemon which configures the leader node to handle logging for compute nodes.

As shown in FIG. 1, each leader node runs an instance of the log manager and an instance of the HA manager. The log manager includes instructions which, when executed in a leader node, enable that leader node to perform operations such as receiving system log data from compute nodes and saving that system log data in shared storage 140.

The HA managers enables the leader nodes to cooperatively distribute logging duties amongst themselves at startup, and to cooperatively and dynamically provide for failover by adjusting logging duties in response to failure and restoration of leader nodes. To distribute logging duties upon startup of multi-node system 100, the leader nodes use their HA managers to decide on a default or normal configuration in which each leader node handles system logging for one cluster. In particular, the leader nodes may adopt that configuration by cooperating to add a different logging address to the listen list in each leader node. As indicated above, the initial or default logging address in the listen list for a leader node may be considered the primary logging address to be serviced by that leader node.

The HA managers also enables leader nodes to provide for failover. For instance, the HA manager in each leader node may use the global HA settings to keep track of which leader nodes are operational and which logging addresses are being handled by which leader nodes. The HA manager in each leader node may also detect the failure of any other leader node. The HA managers may then respond by automatically (i.e., without human intervention) selecting a leader node to serve as a failover node for the failed node. For instance, if leader node 120B fails, HA manager 124A may configure leader node 120A to serve as the failover node for leader node 120B. Or if leader node 120A fails, HA manager 124B may configure leader node 120B to serve as the failover node for leader node 120A. In particular, the HA manager in a first leader node may configure that leader node to serve as a failover node for a second leader node by configuring the failover leader node to handle multiple logging addresses, including the primary logging address of the failover node, as well as the orphan logging address that was being handled by the failed node. Also, the leader nodes may use leader resource lock 146 to cooperatively decide which leader node will serve as the failover node.

The HA manager may also update the global HA settings in each leader node whenever the global configuration has changed (e.g., in response to a leader node being configured to serve as a failover node, or in response to a failed leader node being restored and taking logging duties back from a failover node.)

As indicated above, the listen list in a leader node identifies the IP address(es) to be handled by that leader node. In other words, the log manager in each leader node receives system log data from compute nodes based on the listen list in that leader node. For instance, FIG. 1 shows listen list 127A in local HA settings 126A in leader node 120A, and FIG. 1 shows listen list 127B in local HA settings 126B in leader node 120B. As indicated above, the leader nodes may establish such a configuration, in which each leader node handles one logging address, as a normal or default configuration. FIG. 1 depicts such a default configuration for an example in which listen list 127A includes the logging address to be used by the compute nodes in cluster A (i.e., the logging address "IP address A"), and listen list 127B includes the logging address to be used by the compute nodes in cluster B (i.e., the logging address "IP address B"). Consequently, listen list 127A causes leader node 120A to handle system log data for cluster A, and listen list 127B causes leader node 120B to handle system log data for cluster B. However, as described in greater detail below, if leader node 120B (for example) were to fail, leader node 120A (for example) could automatically take over logging duties for cluster B by adding IP address B to listen list 127A in leader node 120A.

In one example, the leader nodes save the system log data for each compute node in a separate file. For example, leader node 120A may save the system log data for compute nodes 130AA and 130AB in respective system log files 142AA and 142AB, and leader node 120B may save the system log data for compute nodes 130BA and 130BB in respective system log files 142BA and 142BB. Accordingly, the log manager may be referred to as a "syslog server." The log manager may be implemented using the program that is known by the name or trademark of "rsyslog," for example. In addition, the log manager may be configured to save syslog data using a specific path to shared storage 140 (e.g., a path such as "/var/log/HOSTS/hostname," where "hostname" is an identifier for the compute node that generated the syslog data). In other examples, the leader nodes may handle the system log data differently. For instance, the leader nodes may split the system log data for each compute node into separate files.

In one example, head node 110 participate in shared storage 140 as a client, thereby allowing a system administrator to use head node 110 to read all of the system logs for all of the compute nodes from a single source, even though multiple leader nodes may be writing syslog data for multiple compute nodes to that source.

As described in greater detail below, leader nodes may also provide for console management of compute nodes (e.g., by saving console log files 144 for the compute nodes to shared storage 140).

Figure 2:
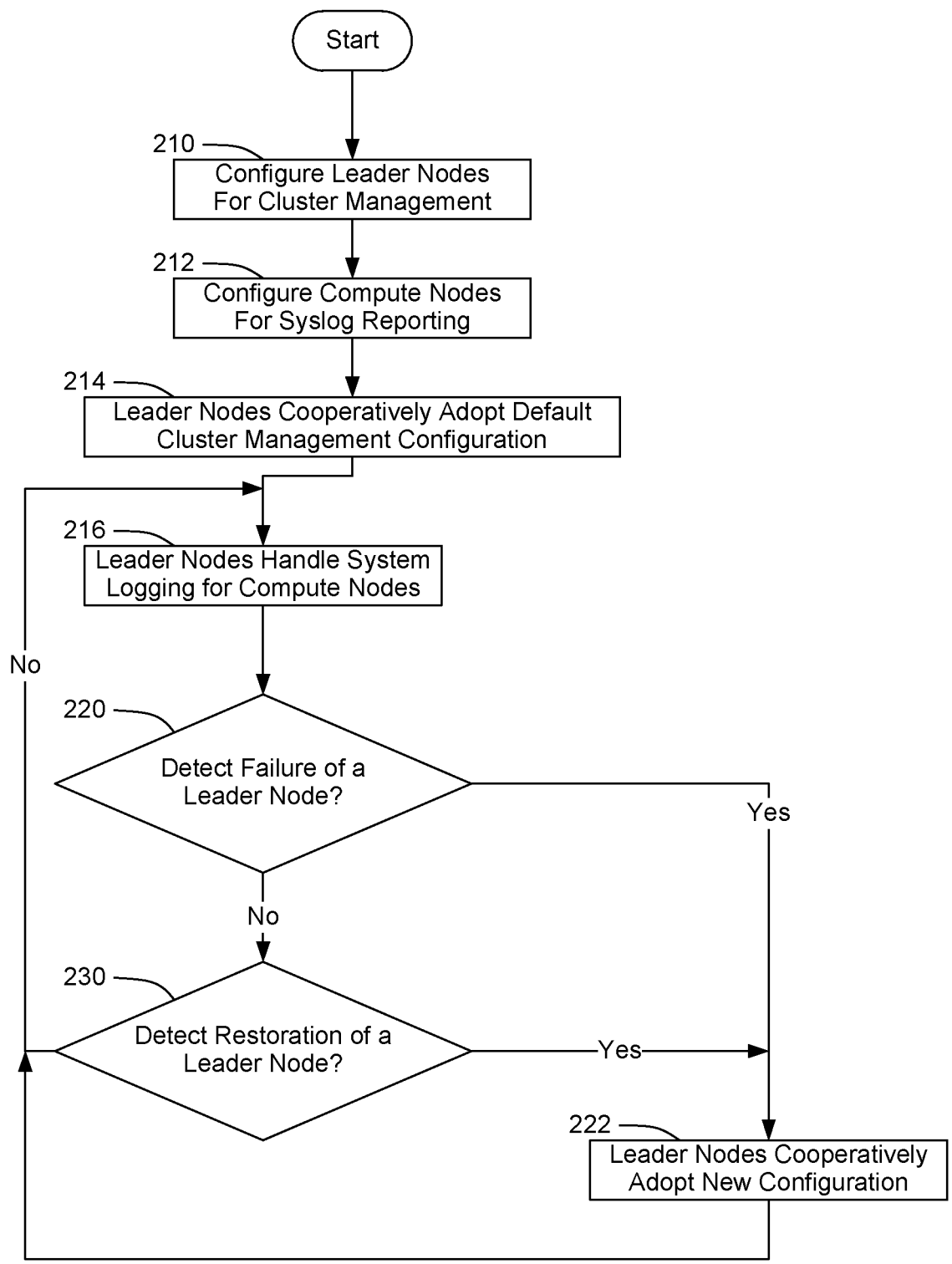
FIG. 2 is a flowchart illustrating a process for resilient logging of system log data according to an example implementation.

FIG. 2 is a flowchart illustrating a process for resilient logging of system log data according to an example implementation. This disclosure describes FIG. 2 in the context of multi-node system 100, as illustrated in FIG. 1. As shown at blocks 210 and 212, the process of FIG. 2 may begin with server manager 114 in head node 110 configuring the leader nodes and the compute nodes with software and configuration settings for system logging, as described above.

As shown at block 214, the leader nodes may then cooperatively adopt a normal or default configuration. In particular, the leader nodes may use their HA managers and global HA settings to verify that all of the leader nodes are running. The leader nodes may then use their HA managers and address pool 118 to assign one logging address to each leader node. In other words, the leader nodes may cooperate to assign a different one of the logging addresses to each leader node. As part of adopting the normal configuration, each leader node may save its assigned logging address in its listen list. The leader nodes thereby establish a default configuration in which each leader node is responsible for handling system logging for one cluster of compute nodes.

Also, as part of establishing the default configuration, the leader nodes may use their HA managers to select one of the leader nodes as a master node that will help to coordinate dynamic failover and restoration among the leader nodes. For instance, the master node may use the health monitor in its HA manager to monitor the health of the rest of the leader nodes. Also, the other leader nodes may use their health monitors to monitor the health of the master node, and if the master node fails, the other leader nodes may select a leader node to server as a new master node. In each leader node, the HA manager may maintain an identifier for the current master node in the global HA settings.

As shown at block 216, multi-node system 100 may then operate with the leader nodes handling system logging for the compute nodes, based on the logging addresses in the listen lists in the leader nodes. In other words, each leader node may receive syslog data that is addressed to the logging address in that node's listen list and save that syslog data to shared storage 140. The flow may remain at block 216 with the leader nodes handling syslog data from their respective clusters until one of the leader nodes fails.

As shown at block 220, when any of the leader nodes fails, the other leader nodes may detect that failure. For instance, as indicated above, if a master node detects the failure of a leader node, the master node may notify the other leader nodes of that failure.

As shown at block 222, in response to failure of a leader node, the remaining leader nodes may automatically change the logging configuration of multi-node system 100. In particular, the HA managers in the leader nodes may cooperatively select one leader node to serve as a failover node for the failed node, and that failover node may add the orphan logging address to the listen list of the failover node. And as indicated above, when making such cooperative decisions and changes, the HA managers may use leader resource lock 146 in shared storage 140 to ensure atomic operations and to ensure that all active leader nodes agree on any configuration changes.

The process may then return to block 216, with the leader nodes handling system logging according to the new/current configuration.

In addition, as shown at block 230, when a failed leader node gets restored to operation, the other leader nodes may detect that restoration. For instance, the health monitor in the master node may detect the restored node, and the HA manager in the master node may respond by notifying the HA managers in the other leader nodes of the restoration.

As shown at block 222, in response to restoration of a failed leader node, the leader nodes may change the logging configuration of multi-node system 100 to shift logging duties for one logging address from the failover node to the restored node. For example, if leader node 120A was serving as the failover node for leader node 120B and then leader node 120B was restored, HA manager 124A in leader node 120A may remove IP address B from listen list 127A, and HA manager 124B in leader node 120B may add IP address B to listen list 127B. The process may then return to block 216, with the leader nodes handling system logging according to the new/current configuration. The leader nodes may then continue to handle system log data and to dynamically respond to changes in the health of leader nodes, as indicated above.

Figure 3:
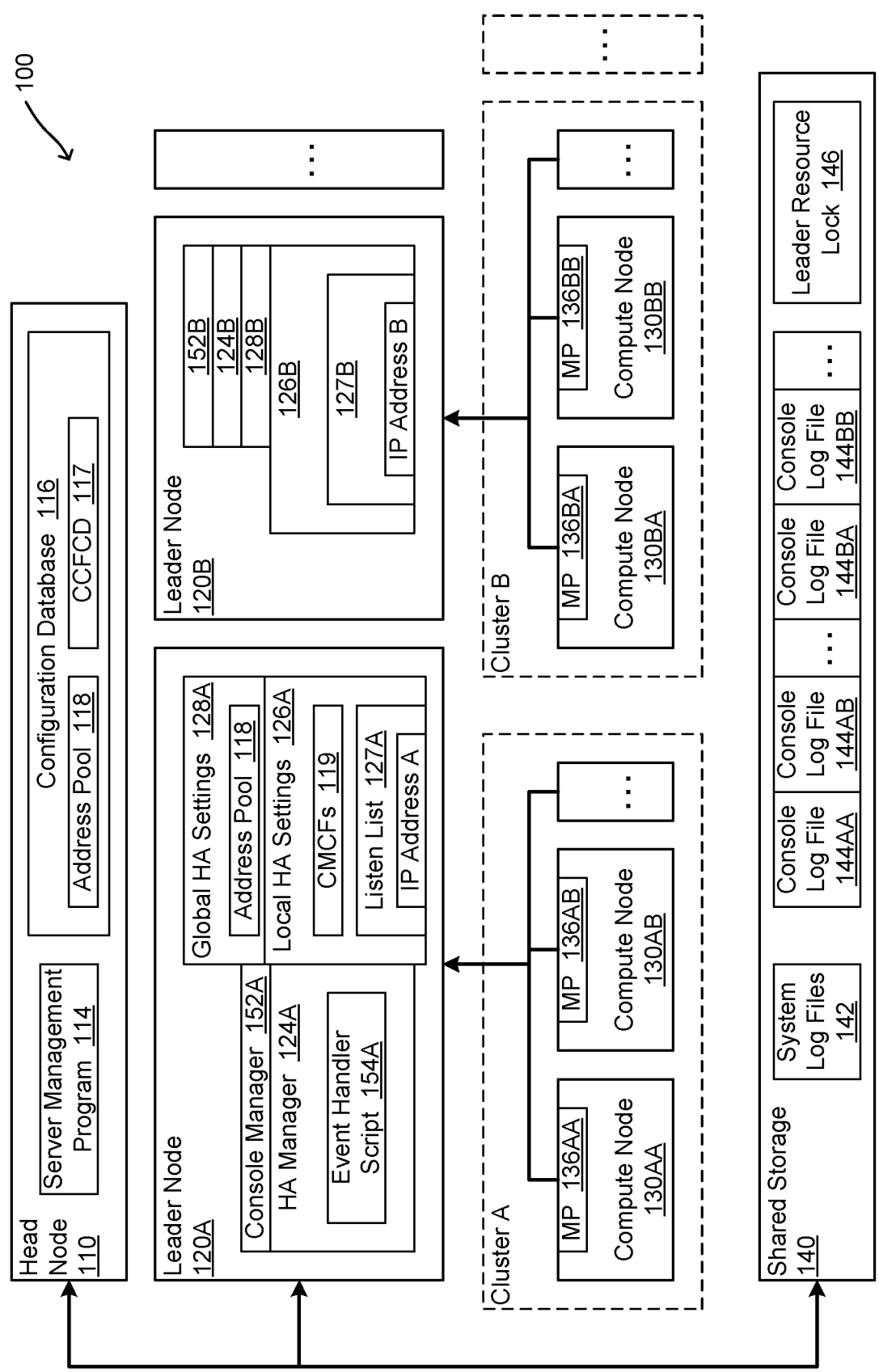
FIG. 3 is a block diagram of a multi-node data processing system with technology for resilient console management according to an example implementation.

FIG. 3 is a block diagram of a multi-node system with technology for resilient console management according to an example implementation. In particular, FIG. 3 depicts an example in which multi-node system 100 provides for system logging as described above with regard to FIGS. 1 and 2, while also providing for console management tasks such as console connection forwarding and console logging. However, while FIG. 1 illustrates components involved in system logging, FIG. 3 focuses more on the components involved with console management. Accordingly, some components of multi-node system 100 are not depicted in FIG. 3, or they are depicted in a different manner. For instance, the system log files in shared storage 140 are depicted collectively as system log files 142.

In the example of FIG. 3, each leader node runs a console management program (or "console manager") which facilitates managed access to the consoles of compute nodes and logging of all corresponding console data. The console manager in a leader node enables that leader node to serve as an intermediary to enable head node 110 to interact with the console of a compute node. In other words, the console manager in a leader node enables head node 110 to interact with the console of a compute node via that leader node. As described in greater detail below, in one example, a console manager in a leader node uses configuration files to establish connections to compute nodes, and those configuration files are part of the local HA settings in that leader node.

In addition, the HA managers in the leader nodes may configure head node 110 for connection forwarding, and the HA managers may provide for automatic failover of console management responsibilities from a failed leader node to a failover leader node. The HA managers may also provide for automatic restoration of console management responsibilities upon recovery a failed leader node.

For instance, the HA managers may initially provision head node 110 with CCFCD 117 to enable a system administrator to use head node 110 to interact with the console on any compute node without the system administrator needing to know which leader node will be providing the connection to the console that compute node. The HA managers may store CCFCD 117 in configuration database 116, for instance. CCFCD 117 may include a list or table that indicates which leader nodes are configured as console bridges to which compute nodes. In other words, as part of setting up console connection forwarding configuration, the HA manager in each leader node may communicate with head node 110 to populate CCFCD 117 in head node 110 with a list of the compute nodes that are being managed by that leader node. Head node 110 may subsequently use those lists to route any request for console access to a particular compute node to the leader node that is managing that compute node. File locking, separated configuration files using include statements, or other mechanisms may be employed to prevent multiple leaders from corrupting CCFCD 117 as a result of from multiple leaders nodes trying to write at the same time. In one example, a leader node may create a lock file on head node 110 using SSH, and may then, using SSH, re-write a portion of CCFCD 117. Other examples may use include files or other mechanisms to prevent corruption.

As indicated above, the HA managers also provide for failover of console management responsibilities. For instance, as described in greater detail below, the HA manager in a failover leader node may use an event handler script to reconfigure that node to handle the console management duties (e.g., console connection forwarding and console logging) that were being handled by the failed node. Those management duties may also include updating CCFCD 117 according to the new configuration.

In the example of FIG. 3, console manager 152A and console manager 152B depict different instances of the console manager, running on leader nodes 120A and 120B, respectively.

The console managers also enable the leader nodes to save a log of each console session in shared storage 140. In one example, the console managers save the console log data for each compute node in a separate file. For example, console manager 152A may save the console log data for compute nodes 130AA and 130AB in respective console log files 144AA and 144AB, and console manager 152B in leader node 120B may save the console log data for compute nodes 130BA and 130BB in respective console log files 144BA and 144BB.

In one example, each compute node includes a management processor (MP), and the leader nodes use those management processors to access the consoles on the compute nodes. In the example of FIG. 3, compute node 130AA includes an MP 136AA, compute node 130AB includes an MP 136AB, etc. Likewise, compute node 130BA includes an MP 136BA, compute node 130BB includes an MP 136BB, etc.

A management processor may be implemented as a microcontroller, a system on a chip (SoC), an embedded processor, or any other suitable type of processor. In some examples, a management processor for a node serves as a node controller or a baseboard management controller (BMC) that provides for lights-out management (LOM) or integrated lights-out (iLO) management of the node. In other examples, multiple nodes may share a single management processor.

As used herein, the term "BMC" refers to a specialized service processor that monitors the physical state of a computer system using sensors and communicates with a management system through an independent "out-of-band" connection. A "computer system" can refer to a server computer, a user computer, or any electronic device or collection of electronic devices. The BMC may also communicate with applications executing at the OS level through an input/output controller (IOCTL) interface driver, an SSH, a Representational State Transfer (REST) application program interface (API), or some other system software proxy that facilitates communication between the BMC and applications. The BMC may have hardware-level access to hardware components located in the computer system. The BMC may be able to directly modify the hardware components. The BMC may operate independently of the OS of the computer system that the BMC is located in. The BMC may be located on the motherboard or main circuit board of the computer system to be monitored. The fact that a BMC is mounted on a motherboard of the managed computer system or otherwise connected or attached to the managed computer system does not prevent the BMC from being considered separate from a processing resource that executes the OS. A BMC has management capabilities to manage components of the computer system. Examples of management capabilities of the BMC can include any or some combination of the following: power control, thermal monitoring and control, fan control, system health monitoring, remote access of the computer system, remote reboot of the computer system, system setup and deployment, system security, and so forth.

In some examples, a BMC can provide so-called "lights-out" functionality for computing devices. The lights out functionality may allow a user such as a systems administrator to perform management operations on the computer system even if an OS is not installed or not functional on the computer system. Moreover, in some examples, the BMC can run on auxiliary power (e.g., battery power); as a result, the computer system does not have to be powered on to allow the BMC to perform its operations. The services provided by the BMC may be considered "out-of-band" services, since the OS may not be running and in some cases the computer system may be powered off or not functioning properly (e.g., the computer system has experienced a fault or hardware failure).

The BMC may include a communication interface, such as a network interface, and/or a serial interface that an administrator or other entity can use to remotely communicate with the BMC. An "out-of-band" service can be provided by the BMC via a dedicated management channel (e.g., the communication interface), and the "out-of-band" service can be available whether or not the computer system is in a powered on state.

Figure 4:
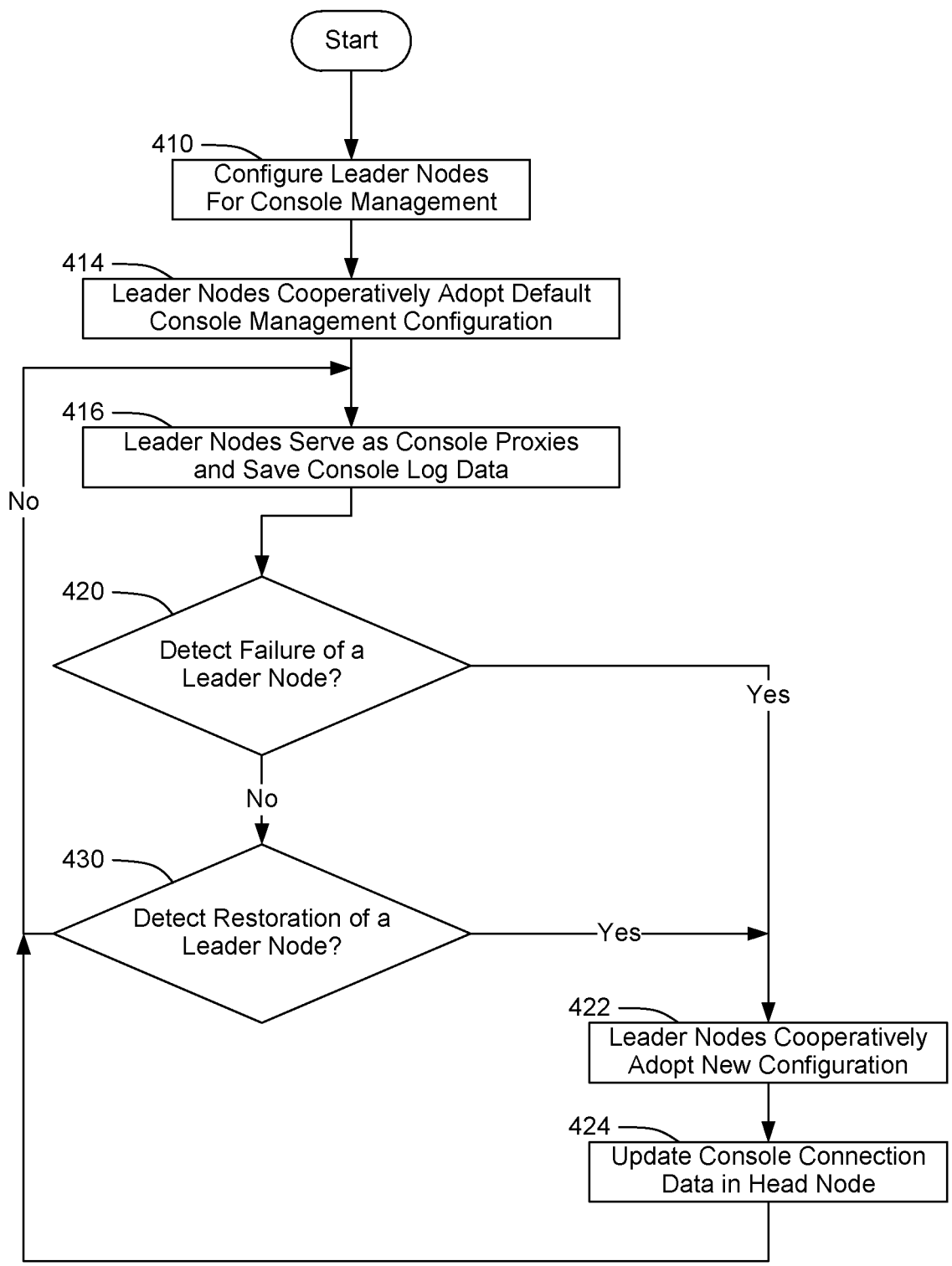
FIG. 4 is a flowchart illustrating a process for resilient console management according to an example implementation.

FIG. 4 is a flowchart illustrating a process for resilient console management according to an example implementation. However, the process of FIG. 4 may run in parallel with the process of FIG. 2. For instance, as shown at block 410, the process of FIG. 4 starts with server manager 114 configuring the leader nodes for console management. And server manager may perform that operation as part of the operation for configuring leader nodes for cluster management, as shown at block 210 of FIG. 2. Configuring the leader node for console management may include pushing console management data from head node 110 to the leader nodes, to enable the leader nodes to provide console connection forwarding to the compute nodes. For instance, the console management data may include a table that identifies each compute node and that indicates which logging address is assigned to each compute node, and server manager 114 may include the console management data in the global HA settings that are pushed to the leader nodes.

As shown at block 414, the leader nodes may then use their HA managers to cooperatively adopt a default console management configuration. That operation may be performed, for instance, as part of the operation for cooperatively adopt a default cluster management configuration, as shown at block 214 of FIG. 2. In one embodiment, the HA managers are designed to establish a default console management configuration that mirrors the system logging configuration, with each leader node to serve as a console manager to the compute nodes in the cluster for which that leader node is handling system logging. For instance, with regard to FIG. 3, the HA managers may establish a default configuration in which leader node 120A is to serve as a console manager to the compute nodes in cluster A and leader node 120B is to server as a console manager to the compute nodes in cluster B. When a leader node serves as a console manager, the leader node may perform console management duties such as console connection forwarding and console logging.

Part of adopting the default cluster management configuration may be for each leader node to create configuration files for its console manager, to enable the console manager to connect to the console of each compute node under that leader node. For purposes of this disclosure, a configuration file to enable a leader node to connect to a console of a compute node may be referred to as a "console manager configuration file" (CMCF). A leader node may save its CMCFs in the local HA settings. For instance, when leader node 120A is to serve as a console bridge to the compute nodes in cluster A, HA manager 124A may create a first CMCF to enable console manager 152A to connect to the console of compute node 103AA, a second CMCF to enable console manager 152A to connect to the console of compute node 130AB, etc. HA manager 124A may save those CMCFs 119 in local HA settings 126A.

The HA manager in each leader node may also update configuration database 116 in head node with CCFCD 117. As indicated above, CCFCD 117 is configuration data to enable head node 110 to access consoles on compute nodes via leader nodes using console connection forwarding.

As shown at block 416 of FIG. 4, the leader nodes may then serve as console bridges and save any associated console log data, as needed. For instance, console manager 152A may enable a human system administrator to use head node 110 to access the console of compute node 130AA via leader node 120A. And console manager 152A may save the associated console log data in shared storage 140. And the operations of block 416 may be performed in parallel with the operation for handling system logging for compute nodes, as shown at block 216 of FIG. 2.

As shown at block 420 of FIG. 4 (which may also correspond to block 220 of FIG. 2), the HA managers may detect failure of a leader node. If so, as shown at block 422 (which may be performed in parallel with claim 22 of FIG. 2), the HA managers may respond by cooperatively adopting a new configuration for console management. For instance, whenever the HA managers select a failover node for system logging, the HA manager may select that same failover node for console management.

In one example, the HA manager in each leader node includes an event handler script that automatically executes whenever a logging address is added to or removed from the listen list in that leader node, and the HA managers use those event handler scripts to adopt the new configuration. For example, in a scenario involving leader node 120A being selected as the failover node for a failed leader node 120B, HA manager 124A adds IP address B to listen list 127A. In response, the event handler script 154A in HA manager 124A retrieves a list of the compute nodes in cluster B from global HA settings 128A. (As indicated above, the global HA settings may include console management data to identify which compute nodes belong to which cluster.) Event handler script 154A then creates new CMCFs to enable console manager 152A to connect to the consoles of the compute nodes in cluster B. And event handler script 154A may save those CMCFs in local HA settings 126A.

As shown at block 424, the HA manager in the failover node may then notify head node 110 about the changes to the console management configuration, to enable head node 110 to use the failover node for console connection forwarding to compute nodes that were under the failed node. In other words, when adapting a new configuration, the leader node will update CCFCD 117 in head node 110 to reflect the new configuration. In other words, the HA manager reconfigures head node 110 to cause head node 110 to use the failover node for access to consoles on the compute nodes that are now being managed by the failover node. A human administrator may then run the console command for any compute node from head node 110, even though that compute node could be served by any leader node.

The process may then return to block 416, with leader nodes serving as console bridges and saving console log data according to the current configuration of multi-node system 100.

However, if the leader nodes detect restoration of a leader node, the process may pass though block 430 to block 422, with the leader nodes then adopting a new configuration that shifts console management duties back to the restored node from the failover node. Consequently, the former failover node may remove a logging address from its listen list, which may trigger the event handler script, which may update the local HA settings by deleting the CMCFs for the compute nodes that are being transferred back to the restored node. And as shown at block 424, the leader nodes may notify head node 110 about that new/restored configuration.

In addition, when cooperatively adopting configurations, leader nodes may use leader resource lock 146 to ensure atomic operations for changes to listen lists, etc.

Further Implementations:

FIG. 5 is a block diagram of a computer-readable medium 510 comprising instructions 520 which, upon execution by a node in a multi-node data processing system, enable the node to serve as a leader node. In particular, instructions 520 enable the node to serve as a first leader node by receiving system log data from multiple compute nodes in a first cluster of the multi-node data processing system, saving the system log data in shared storage that is also used by a second leader node to save system log data for compute nodes in a second cluster of the multi-node data processing system and by a third leader node to save system log data for compute nodes in a third cluster of the multi-node data processing system, and in response to failure of either of the second and third leader nodes, automatically assuming system logging duties for the compute nodes in the cluster that was associated with the failed leader node.

In some examples that may be in combination with the foregoing example, the instructions enable the first leader node to receive system log data from the compute nodes in the first cluster based on a listen list in the first leader node, and the listen list comprises an IP address to be used by compute nodes in the first cluster to send system log data to a current leader node for the first cluster.

In some examples that may be in combination with any of the foregoing examples, the IP address to be used by compute nodes in the first cluster to send system log data to a current leader node comprises a first IP address, and the instructions enable the first leader node to automatically assume system logging duties for the second cluster by adding a second IP address to the listen list in the first leader node, wherein the second IP address is to be used by compute nodes in the second cluster to send system log data to a current leader node for the second cluster.

In some examples that may be in combination with any of the foregoing examples, the instructions further enable the first leader node, as part of an initialization process, to cooperate with other leader nodes in the multi-node data processing system to distribute system logging duties among the leader nodes.

In some examples that may be in combination with any of the foregoing examples, the instructions enable the first leader node to receive system log data from compute nodes based on a listen list in the first leader node. Also, to distribute system logging duties among the leader nodes comprises to add, to the listen list in the first leader node, an IP address to be used by compute nodes in the first cluster to send system log data to a current leader node for the first cluster.

In some examples that may be in combination with any of the foregoing examples, the instructions enable the first leader node, after assuming system logging duties for the second cluster, to automatically determine whether the second leader node has been restored, and in response to a determination that the second leader node has been restored, automatically relinquish system logging duties for the second cluster to the second leader node.

In some examples that may be in combination with any of the foregoing examples, the instructions further enable the first leader node to serve as a console bridge, to enable a head node in the multi-node data processing system to access a console of a compute node in the first cluster via the first leader node. The instructions further enable the first leader node to save console log data for the compute node in the shared storage.

In some examples that may be in combination with any of the foregoing examples, the instructions further enable the first leader node to automatically assume console bridge duties for the second cluster, in response to failure of the second leader node.

Figure 6:
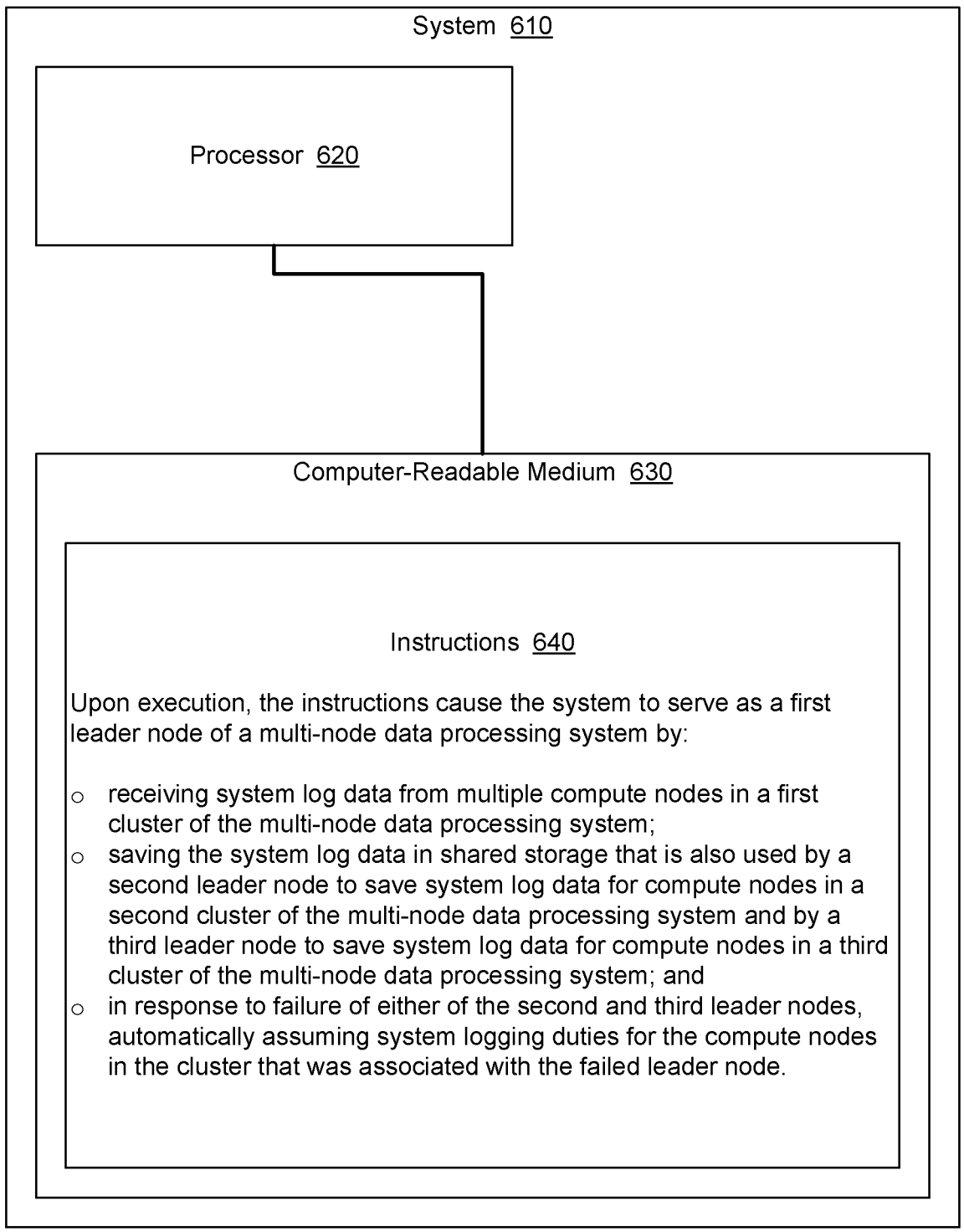
FIG. 6 is a block diagram of a system having technology for resilient logging of system log data.

FIG. 6 is a block diagram of a system 610 having technology for resilient logging of system log data. System 610 comprises a processor 620, a computer-readable medium 630 coupled to processor 620, and instructions 640 in the computer-readable medium. When executed by processor 620, instructions 640 enable system 610 to serve as a first leader node of a multi-node data processing system by receiving system log data from multiple compute nodes in a first cluster of the multi-node data processing system, saving the system log data in shared storage that is also used by a second leader node to save system log data for compute nodes in a second cluster of the multi-node data processing system and by a third leader node to save system log data for compute nodes in a third cluster of the multi-node data processing system, and in response to failure of either of the second and third leader nodes, automatically assuming system logging duties for the compute nodes in the cluster that was associated with the failed leader node.

In some examples that may be in combination with the previous example, the instructions enable the system to receive system log data from the compute nodes in the first cluster based on a listen list in the system, the listen list comprises a first IP address to be used by compute nodes in the first cluster to send system log data to a current leader node for the first cluster, and the instructions enable the system to automatically assume system logging duties for the second cluster by adding a second IP address to the listen list in the system, wherein the second IP address is to be used by compute nodes in the second cluster to send system log data to a current leader node for the second cluster.

In some examples that may be in combination with any of the foregoing examples, the instructions enable the system to receive system log data from compute nodes based on a listen list in the system. Also, the instructions further enable the system, as part of an initialization process, to cooperate with other leader nodes in the multi-node data processing system to distribute system logging duties among the leader nodes, wherein to distribute system logging duties among the leader nodes comprises to add, to the listen list in the system, an IP address to be used by compute nodes in the first cluster to send system log data to a current leader node for the first cluster.

In some examples that may be in combination with any of the foregoing examples, the instructions enable the system, after assuming system logging duties for the second cluster, to automatically determine whether the second leader node has been restored, and in response to a determination that the second leader node has been restored, automatically relinquish system logging duties for the second cluster to the second leader node.

In some examples that may be in combination with any of the foregoing examples, the instructions further enable the system to serve as a console bridge, to enable a head node in the multi-node data processing system to access a console of a compute node in the first cluster via the system. The instructions also enable the system to save console log data for the compute node in the shared storage.

In some examples that may be in combination with any of the foregoing examples, the instructions further enable the system to automatically assume console bridge duties for the second cluster, in response to failure of the second leader node.

In some examples that may be in combination with any of the foregoing examples, the instructions enable the system to use a management processor of the compute node to access the console of the compute node for the head node.

Figure 7:
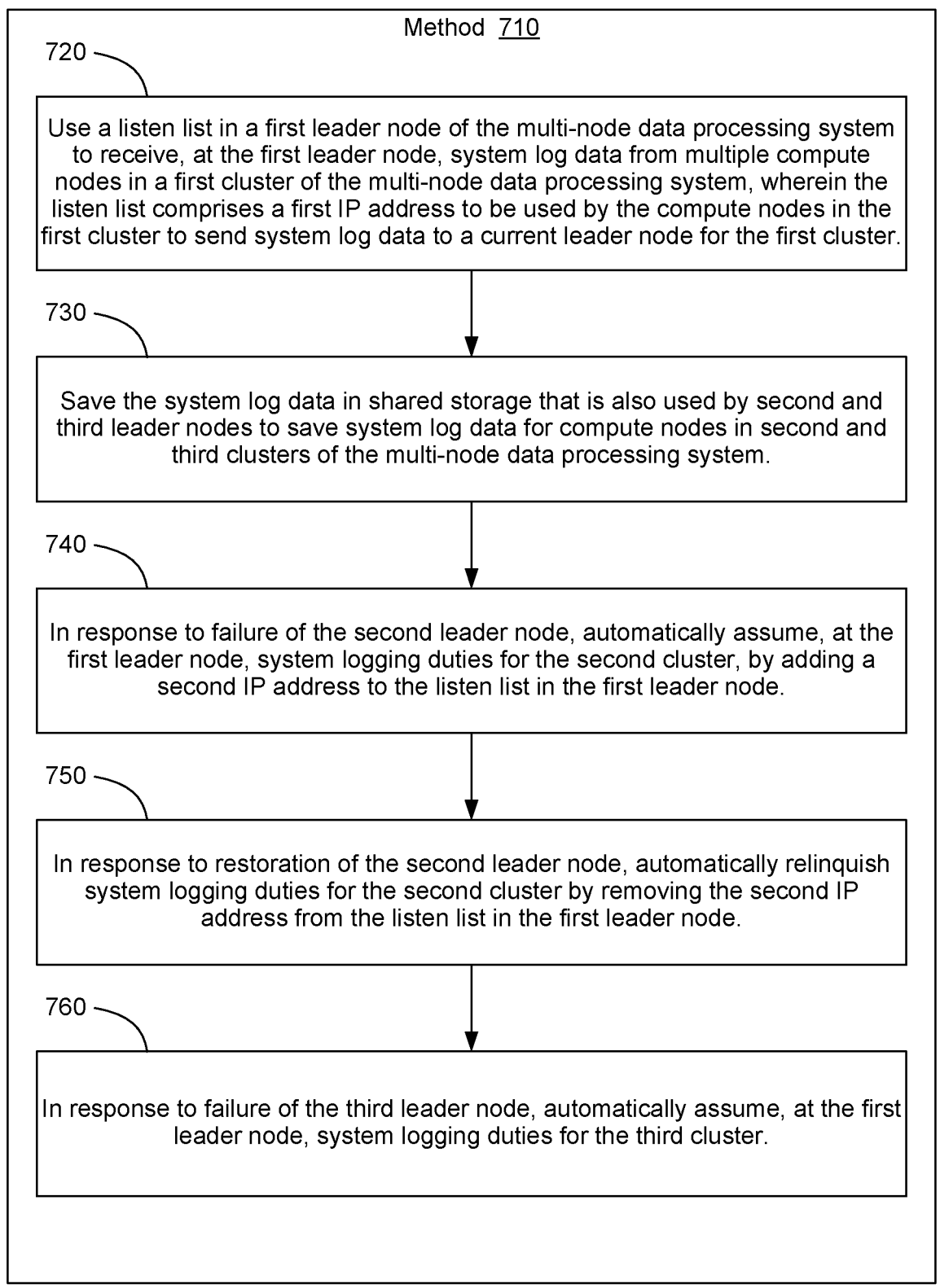
FIG. 7 is flowchart illustrating a method for managing logs in a multi-node data processing system.

FIG. 7 is flowchart illustrating a method 710 for managing logs in a multi-node data processing system. As shown at block 720, the method comprises using a listen list in a first leader node of the multi-node data processing system to receive, at the first leader node, system log data from multiple compute nodes in a first cluster of the multi-node data processing system, wherein the listen list comprises a first IP address to be used by the compute nodes in the first cluster to send system log data to a current leader node for the first cluster. As shown at block 730, the method also comprises saving the system log data in shared storage that is also used by second and third leader nodes to save system log data for compute nodes in second and third clusters of the multi-node data processing system. As shown at block 740, the method also comprises, in response to failure of the second leader node, automatically assuming, at the first leader node, system logging duties for the second cluster, by adding a second IP address to the listen list in the first leader node. As shown at block 750, the method also comprises, in response to restoration of the second leader node, automatically relinquishing system logging duties for the second cluster by removing the second IP address from the listen list in the first leader node. As shown at block 760, the method also comprises, in response to failure of the third leader node, automatically assuming, at the first leader node, system logging duties for the third cluster.

In some examples that may be in combination with the foregoing example, the method further comprises, at the first leader node, serving as a console bridge, to enable a head node in the multi-node data processing system to access a console of a compute node in the first cluster via the first leader node. And the method further comprises saving console log data for the compute node in the shared storage.

In some examples that may be in combination with any of the foregoing examples, the method further comprises, at the first leader node, automatically assuming console bridge duties for the second cluster, in response to failure of the second leader node.

In some examples that may be in combination with any of the foregoing examples, the operation of serving as a console bridge, to enable the head node to access the console of the compute node comprises using a management processor of the compute node to access the console of the compute node for the head node.

In some examples that may be in combination with any of the foregoing examples, the method further comprises determining, at the first leader node, whether any other leader node in the multi-node data processing system has failed; and in response to determining that any other leader node in the multi-node data processing system has failed, automatically assuming system logging duties for the failed leader node.

CONCLUSION

As described above, leader nodes in a multi-node system include HA managers which provide for failover by ensuring that IP aliases from failed leader nodes are moved to working leader nodes and services are redistributed.

The HA manager includes an event/notification mechanism. This mechanism is configured by the server management program when the leader nodes are initially setup. This mechanism is used to notify components such as the console manager that configuration files need to be recomputed, since a leader node may now be working with a different set of compute nodes than before.

Furthermore, the multi-node system may continue to operate, and to provide for automatically failover, even if the head node is lost (e.g., due to failure of the head node, rebooting of the head node for maintenance, etc.). All compute nodes may continue to operate even if the head node is lost, even if a leader node is lost, and even if the head node and a leader node (or multiple leader nodes) are lost. Vision into compute nodes from the head node may be lost, but jobs on the compute nodes may continue to run. For example, if the head node has died, the configuration operations attempted by leader nodes to configure the head node for console connection forwarding will fail. However, when the head node comes back up, it may run a script or program at boot that tells all of the leader nodes to update the CCFCD in the head node to match the current mapping of leader nodes to compute nodes for console management. No console logs would have been lost while the head node was down, since they continued to be written by leader nodes to the shared storage even while the head node was down.

A head node may use a server management program to set up the leader nodes and the compute nodes initially. The head node may also use the server management program to adjust the configuration in response to changes in the composition of the multi-node system (e.g., if the state of the system changes, such as when equipment is added or removed by a system administrator). However, once initialization is complete, the multi-node system can run without the head node, and the leader nodes may cooperate to track the health of the leader nodes and to adapt to failures as necessary.

As indicated above, a device may include a processor and instructions and other data which, when accessed by the processor, cause the device or enable the device to perform particular operations. For purposes of this disclosure, instructions which cause or enable a device to perform operations may be referred to in general as "software." Software may also be referred to as "control logic." Software that is used during a boot process may be referred to as "firmware." Software that is stored in nonvolatile memory may also be referred to as "firmware." Software may be organized using any suitable structure or combination of structures. Accordingly, terms like "program" may be used in general to cover a broad range of software constructs, including without limitation application programs, subprograms, routines, functions, procedures, drivers, libraries, processes, microcode, and other types of software components. Also, it should be understood that a software module (e.g., a program) may include more than one component, and those components may cooperate to complete the operations of the module. Also, the operations which the software causes a device to perform may include creating an operating context, instantiating a particular data structure, etc. An example implementation may include software to execute on a programmable system that comprises a processor coupled to a storage device containing the software.

While the present disclosure has been described with respect to a limited number of implementations or examples, those skilled in the art, having the benefit of this disclosure, will appreciate numerous modifications and variations therefrom. It is intended that the appended claims cover all such modifications and variations.

What is claimed is:

1. A non-transitory computer-readable medium comprising instructions which, upon execution by a node in a multi-node data processing system, enable the node to serve as a first leader node by:
   receiving system log data from multiple compute nodes in a first cluster of the multi-node data processing system;
   saving the system log data in shared storage that is also used by a second leader node to save system log data for compute nodes in a second cluster of the multi-node data processing system and by a third leader node to save system log data for compute nodes in a third cluster of the multi-node data processing system; and
   in response to failure of either of the second and third leader nodes, automatically assuming system logging duties for the compute nodes in the cluster that was associated with the failed leader node.

2. A non-transitory computer-readable medium according to claim 1, wherein:
   the instructions enable the first leader node to receive system log data from the compute nodes in the first cluster based on a listen list in the first leader node; and
   the listen list comprises an internet protocol (IP) address to be used by compute nodes in the first cluster to send system log data to a current leader node for the first cluster.

3. A non-transitory computer-readable medium according to claim 2, wherein:
   the IP address to be used by compute nodes in the first cluster to send system log data to a current leader node comprises a first IP address; and
   the instructions enable the first leader node to automatically assume system logging duties for the second cluster by adding a second IP address to the listen list in the first leader node, wherein the second IP address is to be used by compute nodes in the second cluster to send system log data to a current leader node for the second cluster.

4. A non-transitory computer-readable medium according to claim 1, wherein the instructions further enable the first leader node, as part of an initialization process, to cooperate with other leader nodes in the multi-node data processing system to distribute system logging duties among the leader nodes.

5. A non-transitory computer-readable medium according to claim 4, wherein:
   the instructions enable the first leader node to receive system log data from compute nodes based on a listen list in the first leader node; and
   to distribute system logging duties among the leader nodes comprises to add, to the listen list in the first leader node, an internet protocol (IP) address to be used by compute nodes in the first cluster to send system log data to a current leader node for the first cluster.

6. A non-transitory computer-readable medium according to claim 1, wherein the instructions enable the first leader node, after assuming system logging duties for the second cluster, to:
   automatically determine whether the second leader node has been restored; and
   in response to a determination that the second leader node has been restored, automatically relinquish system logging duties for the second cluster to the second leader node.

7. A non-transitory computer-readable medium according to claim 1, wherein the instructions further enable the first leader node to:
   serve as a console bridge, to enable a head node in the multi-node data processing system to access a console of a compute node in the first cluster via the first leader node; and
   save console log data for the compute node in the shared storage.

8. A non-transitory computer-readable medium according to claim 7, wherein the instructions further enable the first leader node to automatically assume console bridge duties for the second cluster, in response to failure of the second leader node.

9. A system comprising:
   a processor;
   a computer-readable medium coupled to the processor; and
   instructions in the computer-readable medium which, when executed by the processor, enable the system to serve as a first leader node of a multi-node data processing system by:
   receiving system log data from multiple compute nodes in a first cluster of the multi-node data processing system;
   saving the system log data in shared storage that is also used by a second leader node to save system log data for compute nodes in a second cluster of the multi-node data processing system and by a third leader node to save system log data for compute nodes in a third cluster of the multi-node data processing system; and
   in response to failure of either of the second and third leader nodes, automatically assuming system logging duties for the compute nodes in the cluster that was associated with the failed leader node.

10. A system according to claim 9, wherein:
   the instructions enable the system to receive system log data from the compute nodes in the first cluster based on a listen list in the system;
   the listen list comprises a first internet protocol (IP) address to be used by compute nodes in the first cluster to send system log data to a current leader node for the first cluster; and
   the instructions enable the system to automatically assume system logging duties for the second cluster by adding a second IP address to the listen list in the system, wherein the second IP address is to be used by compute nodes in the second cluster to send system log data to a current leader node for the second cluster.

11. A system according to claim 9, wherein:
   the instructions enable the system to receive system log data from compute nodes based on a listen list in the system; and
   the instructions further enable the system, as part of an initialization process, to cooperate with other leader nodes in the multi-node data processing system to distribute system logging duties among the leader nodes, wherein to distribute system logging duties among the leader nodes comprises to add, to the listen list in the system, an internet protocol (IP) address to be used by compute nodes in the first cluster to send system log data to a current leader node for the first cluster.

12. A system according to claim 9, wherein the instructions enable the system, after assuming system logging duties for the second cluster, to:
automatically determine whether the second leader node has been restored; and
in response to a determination that the second leader node has been restored, automatically relinquish system logging duties for the second cluster to the second leader node.

13. A system according to claim 9, wherein the instructions further enable the system to:
serve as a console bridge, to enable a head node in the multi-node data processing system to access a console of a compute node in the first cluster via the system; and
save console log data for the compute node in the shared storage.

14. A system according to claim 13, wherein the instructions further enable the system to automatically assume console bridge duties for the second cluster, in response to failure of the second leader node.

15. A system according to claim 13, wherein the instructions enable the system to use a management processor of the compute node to access the console of the compute node for the head node.

16. A method for managing logs for a multi-node data processing system, the method comprising:
using a listen list in a first leader node of the multi-node data processing system to receive, at the first leader node, system log data from multiple compute nodes in a first cluster of the multi-node data processing system, wherein the listen list comprises a first internet protocol (IP) address to be used by the compute nodes in the first cluster to send system log data to a current leader node for the first cluster;
saving the system log data in shared storage that is also used by second and third leader nodes to save system log data for compute nodes in second and third clusters of the multi-node data processing system;
in response to failure of the second leader node, automatically assuming, at the first leader node, system logging duties for the second cluster, by adding a second IP address to the listen list in the first leader node;
in response to restoration of the second leader node, automatically relinquishing system logging duties for the second cluster by removing the second IP address from the listen list in the first leader node; and
in response to failure of the third leader node, automatically assuming, at the first leader node, system logging duties for the third cluster.

17. A method according to claim 16, further comprising:
at the first leader node, serving as a console bridge, to enable a head node in the multi-node data processing system to access a console of a compute node in the first cluster via the first leader node; and
saving console log data for the compute node in the shared storage.

18. A method according to claim 17, further comprising:
at the first leader node, automatically assuming console bridge duties for the second cluster, in response to failure of the second leader node.

19. A method according to claim 18, wherein the operation of serving as a console bridge, to enable the head node to access the console of the compute node comprises:
using a management processor of the compute node to access the console of the compute node for the head node.

20. A method according to claim 16, further comprising:
determining, at the first leader node, whether any other leader node in the multi-node data processing system has failed; and
in response to determining that any other leader node in the multi-node data processing system has failed, automatically assuming system logging duties for the failed leader node.

\* \* \* \* \*